United States Patent [19]

Williamson

[11] 4,159,026

[45] Jun. 26, 1979

[54] SOLENOID OPERATED PILOT VALVE

[75] Inventor: Larry A. Williamson, Farmington Hills, Mich.

[73] Assignee: Detroit Coil Company, Ferndale, Mich.

[21] Appl. No.: 919,793

[22] Filed: Jun. 28, 1978

Related U.S. Application Data

[63] Continuation of Ser. No. 754,425, Dec. 27, 1976, abandoned.

[51] Int. Cl.² ............................................. F16K 31/08
[52] U.S. Cl. .............................. 137/625.5; 137/625.65; 251/65; 251/139
[58] Field of Search ..................... 137/625.5, 625.65; 251/65, 139, 141

[56] References Cited

U.S. PATENT DOCUMENTS

| | | | |
|---|---|---|---|
| 3,361,161 | 1/1968 | Schwartz | 251/65 X |
| 3,521,851 | 7/1970 | Sorrow | 137/625.65 X |

Primary Examiner—Gerald A. Michalsky
Attorney, Agent, or Firm—Burton, Parker & Schramm

[57] ABSTRACT

In a Solenoid Operated Pilot Valve, the solenoid plunger serves as a valving element blocking the flow of pilot fluid through orifices disposed at opposite ends of the plunger movement with the plunger being shifted in one direction under the influence of the solenoid coil to block the pilot fluid flow through one orifice and upon de-energization of the solenoid coil the plunger is shifted in the opposite direction by a permanent magnet to block the fluid flow through the orifice at the other end of plunger movement.

8 Claims, 4 Drawing Figures

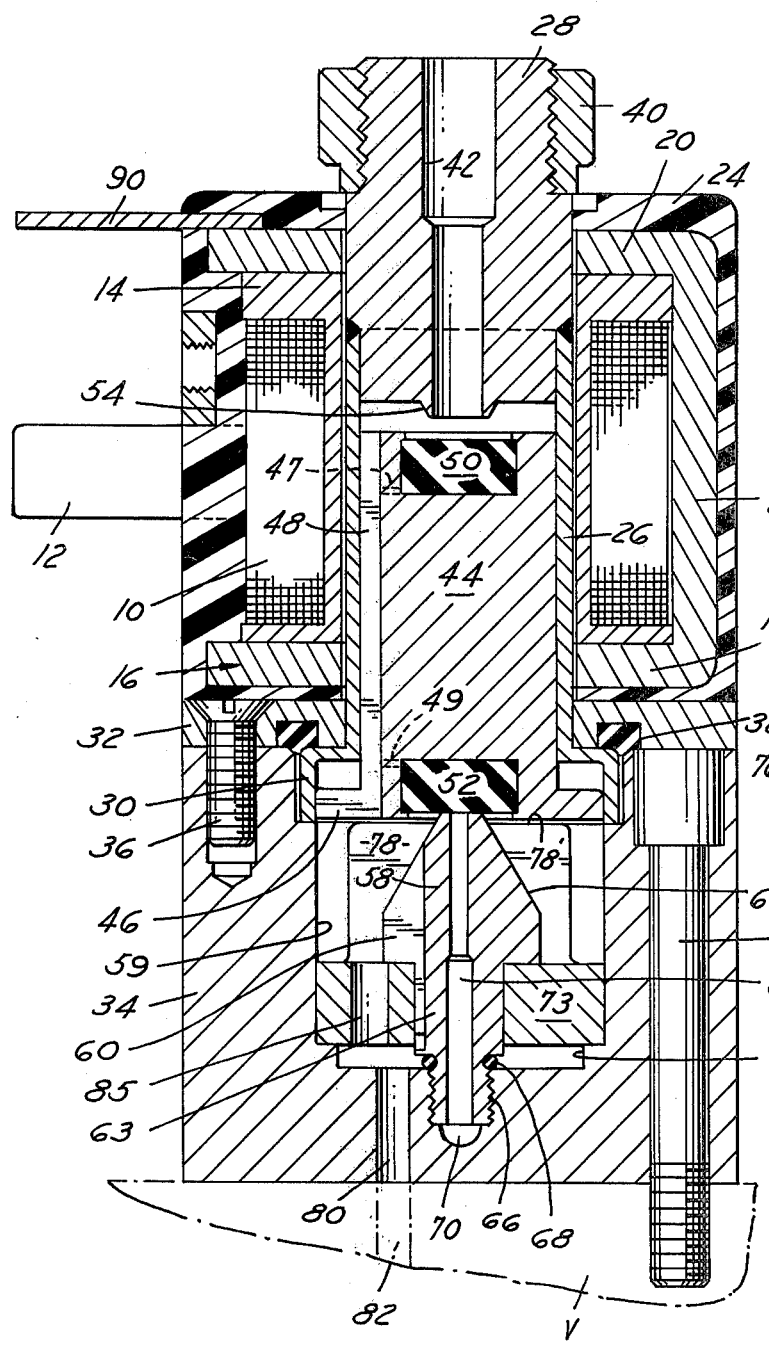

SOLENOID OPERATED PILOT VALVE

This is a continuation of application Ser. No. 754,425, filed Dec. 27, 1976, now abandoned.

FIELD OF INVENTION

This invention relates to solenoid operated pilot valves such as are used for controlling operation of larger valves wherein the pilot fluid, such as air, is controlled in delivery to the larger valve by operation of the pilot valve.

BACKGROUND OF THE INVENTION

In the typical solenoid operated pilot valve, a solenoid coil serves to shift the solenoid plunger, which acts as a valving element, in one direction to block the flow of the pilot air through a port at one end of the plunger travel and a coil return spring shifts the plunger in the opposite direction upon de-energization of the solenoid coil to block the flow of pilot air through another port at the opposite end of plunger travel. The coil spring has been known to break rendering the pilot valve inoperative. In addition, after repeated usage the return spring may fatigue reducing the spring force and thereby increasing the lag time in operation of the valve. Also, the force resulting from the air pressure against the solenoid plunger is relied upon to help overcome the force of the return spring when the solenoid is energized and consequently such valves will only function with at least a given minimum air pressure.

I have discovered that the return spring for shifting the plunger in one direction upon de-energization of the solenoid coil may be eliminated and the above-mentioned disadvantages attendant from its use thereby obviated.

SUMMARY OF THE INVENTION

I have discovered that an extremely satisfactory solenoid operated pilot valve may be provided wherein a permanent magnet is used to shift the plunger in the opposite direction upon de-energization of the solenoid coil. The permanent magnet is not subject to failure and does not require the application of air pressure to the valve in order to assist the solenoid coil in shifting the plunger. Accordingly, the improved pilot valve will function without any air pressure being supplied to the valve.

DESCRIPTION OF THE DRAWINGS

FIG. 1 is a cross-sectional elevational view through a solenoid operated pilot valve embodying the invention;

FIG. 2 is a side elevation of the permanent magnet and adjacent pilot air orifice at one end of the stroke of the solenoid plunger;

FIG. 3 is a top view of the structure shown in FIG. 2; and

FIG. 4 is a cross sectional elevation through an alternative form of the solenoid plunger.

BRIEF DESCRIPTION OF PREFERRED EMBODIMENTS

In FIG. 1 I have shown a solenoid operated pilot valve which includes a solenoid coil 10 to which are connected a pair of terminals only one of which is indicated at 12, the other being hidden behind terminal 12 and not visible. Such terminals are adapted to be connected to an energizing circuit for the solenoid coil. The coil is wound in conventional fashion on a nylon bobbin or the like 14. A generally U-shaped magnet frame 16 having arms 18 and 20 connected together by a bight portion 22 surrounds the coil and serves to provide a low resistance flux path from one end of the coil to the other. The frame 16, coil 10 and bobbin 14 as well as the terminals 12 are preferably potted or encapsulated in an epoxy resin potting material 24.

A cylindrical longitudinal passageway extends through the center of the coil bobbin and the arms 18 and 20 of the frame 16 and through opposite ends of the potting material 24 and within this longitudinal passageway is received a non-magnetic plunger guide tube 26 within one end of which is telescoped a plunger stop 28 which is braised or otherwise securely fastened within the guide tube. The lower end of the guide tube is enlarged to provide a bell mouth flange 30.

Sandwiched between the bell mouth flange 30 and the bottom of the housing 24 is a securing plate 32 for attaching the solenoid assembly to the pilot valve body 34. For this purpose a plurality of screws or the like, one of which is shown at 36, extends through the plate 32 as shown in FIG. 1, for threaded engagement in the pilot valve body 34. A sealing ring or the like 38 is received in a suitably provided groove in the plate 32 to bear against the bell mouth flange 30 to effect a fluid tight seal between the abutting surfaces at the seal.

The plunger stop 28 is externally threaded to receive thereon a nut 40 for retaining the coil assembly on the guide tube. The plunger stop 28 is provided with a longitudinal passageway 42 adapted to permit the exhaust of pilot air from the interior of the plunger guideway. Within the plunger guideway or tube 26 is disposed a solenoid plunger 44 which may be fabricated of a non-laminated magnet steel. The plunger is adapted to be a smooth sliding fit within the tube 26. The plunger is provided with a flanged or headed end 46 reciprocable within the bell mouth flange 30 of the guide tube. One or more longitudinal grooves 48 extend throughout the length of the plunger to provide air passageways therealong for pilot air movement from one end of the plunger to the other.

Opposite ends of plunger 44 are provided with elastomeric sealing pads 50 and 52, the former adapted to abut an orifice 54 on the inner end of the plunger stop 28 and thereby close the passageway 42 against the escape of air outwardly of the assembly through such passage. Pad 52 is adapted to bear against the orifice 56 of the orifice member 58. Fluid pressure equalizing passages 47 and 49 open through the side of the plunger from beneath each pad. Member 58 is received in a chamber 59 formed in the pilot valve body and has a conical head 61 provided with an external longitudinally extending slot 60 communicating with a transverse slot 62 in a shank portion 63. A central longitudinally extending passageway 64 extending completely through the orifice member opens outwardly at one end through the orifice 56 and at the opposite end through an externally threaded portion 66 of the shank. The orifice member 58 is screw threaded into the bottom of chamber 59 and sealed therein with a sealing ring 68. The passage 64 within the orifice member communicates with a transverse passageway 70 in the body 34 adapted to be connected to a source of air under pressure, whereby such air is delivered to the orifice member 58.

Disposed within chamber 59 adjacent orifice member 58 is a permanent magnet 73 configured as illustrated in FIGS. 1, 2, and 3. The permanent magnet is seated on a shoulder formed by the chamber counterbore 59'. The magnet structure is of generally U-shaped configuration having a bight portion 74 through which the shank 63 of the orifice member extends and upon which the head 61 of the orifice member seats, and a pair of upstanding arms 76 and 78 overlie the sides of the head 61 in spaced relation therefrom. The orifice member 58 is disposed between the arms 76 and 78 as shown in FIGS. 2 and 3. The upper ends of the arms provide permanent magnet pole faces 76' and 78' adapted to lie closely adjacent head of the plunger with a small air gap therebetween where the plunger pad 52 is seated against and blocks the orifice 56. A passageway 80 extends downwardly through the bottom of the chamber 59 to communicate with the passageway 82 within the valve V to be controlled by the solenoid operated pilot valve. The body 34 of the pilot valve may be connected to the valve V by suitable screws or the like 84, only one of which is shown. The bight portion of the magnet may also be provided with a through aperture 85 to insure ease of communication of pilot air around and through the magnet. The transverse slot 62 is exposed to the chamber 59 beneath the bottom of the magnet as shown in FIGS. 1 and 2 to provide a path for fluid pressure through the magnet in addition to the passage 85.

In operation, when the coil 10 is energized the plunger 44 is shifted upwardly uncovering the orifice 56 and permitting air under pressure in the transverse passage 70 to pass upwardly through the orifice passage 64 and escape beneath the plunger. The pad 50 at the upper end of the plunger will block the orifice 54 in the stop 28 preventing the escape of air through the passageway 42 to the atmosphere and thereby forcing the air entering beneath the plunger to pass downwardly and into the valve V through the passageways 80 and 82. Thus, pilot air is admitted to the valve V to cause operation thereof and such obtains as long as the coil 10 is energized. Upon de-energization of the coil, the permanent magnet 73 will attract the plunger 44 away from the orifice 54 causing the pad 52 to block the orifice 56 and thereby prevent further escape of pilot air from the passageway 64 beneath the plunger. At the same time air in the passageways 80 and 82 will exhaust back into the chamber 59 and thence pass through the slots 48 to escape to the atmosphere through the passageway 42 in the stop 28.

In FIG. 4 I have shown an alternative construction for the plunger wherein pads 50' and 52' are spring biased outwardly by the small coil springs 51 and 53. Pressure equalizing passages 47' and 49' are provided similar to FIG. 1. Such springs will serve to urge the pads 50' and 52' snugly against the orifice openings 54 and 56 when the plunger is in a position bringing the pads thereagainst.

A grounding terminal 90 connected to the frame 16 extends out of the coil assembly for facilitating electrical grounding of the pilot valve.

Trouble-free operation of a pilot valve of the type shown herein in excess of 10 million cycles has established to my satisfaction the merits and utility of the design. I have discovered that with the use of the permanent magnet 73 the pilot valve will function from zero pressure in passageway 70 through normal operating pressure. In addition, because of the construction and arrangement disclosed, upon removal of the pilot valve from the main valve V, the parts will not tend to fly apart and be lost as is the case with pilot valves using a plunger return spring.

What is claimed is:

1. In a solenoid operated valve, in combination:
a solenoid coil;
a passageway extending through the coil;
a plunger reciprocable through the passageway to be shifted in one direction upon energization of the coil;
permanent magnet means for shifting the plunger in the opposite direction upon de-energization of the coil;
orifices disposed at opposite ends of the passageway to be blocked alternately by the plunger at opposite ends of its travel due to energization and de-energization of the coil;
the orifice to be blocked upon de-energization of the coil being defined by an orifice member disposed beyond the plunger and extending axially toward the plunger and having the orifice to be engaged by the plunger for closing the orifice; and
said permanent magnet means being disposed adjacent the orifice member and on opposite sides thereof and having north and south poles confronting the plunger adjacent the orifice.

2. The invention defined by claim 1 wherein opposite ends of the plunger are provided with elastomeric pads for engaging the orifices to block the same.

3. The invention defined by claim 2 wherein spring means are disposed beneath at least one of the pads for urging the same outwardly of the plunger toward the opposed orifice.

4. The invention defined by claim 1 wherein said permanent magnet means comprises a generally U-shaped permanent magnet having two arms and a bight portion with the arms straddling said orifice member and extending generally parallel to the axis of the coil with the permanent magnet poles confronting the plunger and with the orifice member extending through the bight portion of the U-shaped magnet to locate the permanent magnet in relation to the orifice.

5. A solenoid operated valve comprising, in combination:
a plunger guide tube;
a plunger in the tube for reciprocable movement said plunger being magnetically responsive but without a magnet therein;
a plunger stop at one end of the tube providing a fluid orifice;
an encapsulated solenoid coil surrounding the tube;
a valve body at the other end of the guide tube and having a fluid receiving cavity;
means for connecting the valve body and tube and coil together including sealing means for sealing the guide tube and cavity;
an orifice member in said cavity having an orifice opening through an end portion confronting the plunger to be closed thereby on de-energization of the coil; and
a permanent magnet in said cavity supported on said orifice member with both the north and south poles of the magnet confronting the plunger to attract the plunger against the orifice member upon de-energization of the coil.

6. The invention defined by claim 5 wherein the magnet is generally U-shaped comprising a bight portion and two arms with the bight portion abutting surfaces of the cavity and the orifice member extending through the bight portion of the magnet and coupled with the valve body and holding the bight portion against said surfaces, and the arms of the magnet extending along opposite sides of the orifice member toward the plunger with the free ends of such arms comprising poles for attracting the plunger theretoward and into abuttment with the orifice member.

7. The invention defined by claim 5 wherein said orifice member includes a screw threaded shank portion received in a bottom wall of said cavity, and said permanent magnet comprises two arms and a bight portion in generally a U-shaped configuration with the shank portion of the orifice member extending through the bight portion of the U-shape with a shoulder on the orifice member overlying the bight portion and gripping the magnet between such shoulder and surface portions of the cavity for supporting the magnet therein with its arms straddling the orifice member in laterally spaced relation therefrom.

8. A solenoid operated valve, comprising, in combination:

a plunger guide tube with a lower outwardly expanded portion;

a plunger in the tube for reciprocal movement with a lower flange which reciprocates within the expanded portion of the tube, said plunger being magnetically responsive but without a magnet therein;

a plunger stop atop the end of the tube opposite the extended portion;

a body member located at the end of the guide tube opposite the plunger stop;

a plate fastened to the body member and overlying the expanded portion of the tube;

fastening means for fastening said plate to the body member;

a solenoid housing surrounding the guide tube;

an encapsulated solenoid coil within the housing;

securing means for maintaining the solenoid housing in position around the guide tube;

a first orifice in the plunger stop to be closed by the plunger upon energization of the coil;

a second orifice in the body member to be closed by the plunger when the coil is de-energized; and magnet means having north and south poles confronting the plunger to attract the plunger so to close the second orifice upon de-energization of the coil, said poles being on opposite sides of said second orifice.

* * * * *